United States Patent [19]

Peterson

[11] 3,858,308

[45] Jan. 7, 1975

[54] PROCESS FOR MAKING A ROTOR ASSEMBLY

[75] Inventor: A. Duane Peterson, Bainbridge, N.Y.

[73] Assignee: The Bendix Corporation, Southfield, Mich.

[22] Filed: June 22, 1973

[21] Appl. No.: 372,717

[52] U.S. Cl. ............... 29/598, 29/420, 29/608, 75/208 R, 148/103, 148/108, 310/44, 310/156
[51] Int. Cl. ........................................... H02k 15/04
[58] Field of Search ...... 29/598, 608, 420; 310/156, 310/44, 45; 148/103, 105, 108, 31.57; 75/208 R

[56] References Cited
UNITED STATES PATENTS

| | | | |
|---|---|---|---|
| 2,387,073 | 10/1945 | Horlacher | 29/598 |
| 3,531,670 | 9/1970 | Loudon | 310/156 |
| 3,564,705 | 2/1971 | Cochardt | 29/608 |
| 3,655,463 | 4/1972 | Benz | 148/103 |

*Primary Examiner*—Carl E. Hall
*Attorney, Agent, or Firm*—Raymond J. Eifler

[57] ABSTRACT

A process for making a rotor assembly for a permanent magnet generator. The rotor assembly comprises a ferromagnetic hub and a ring-shaped cobalt and rare earth alloy magnet which is mounted on the hub. The process for making a rotor assembly includes applying to a hub a coating of inert material having a melting point above the sintering temperature of the cobalt alloy magnet before pressing and sintering the cobalt alloy onto the ferromagnetic hub.

9 Claims, 3 Drawing Figures

FIG. 1
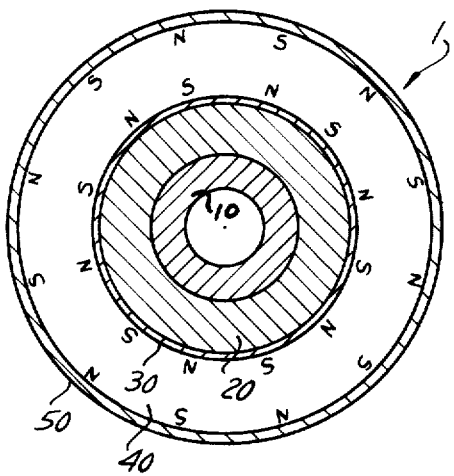
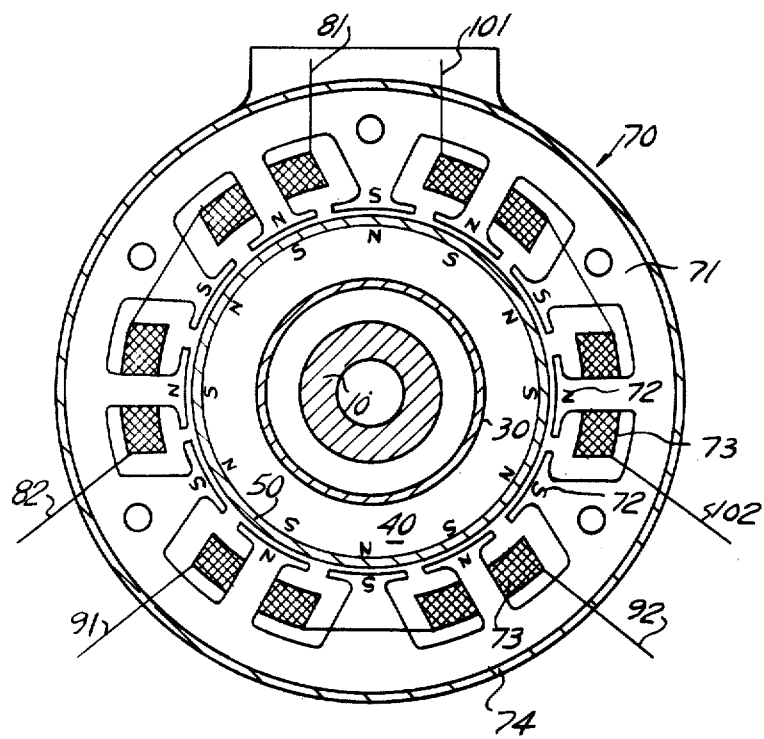
FIG. 2
FIG. 3
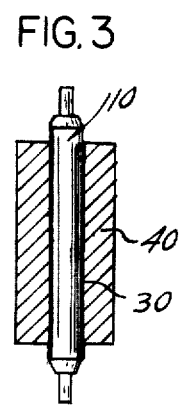

PROCESS FOR MAKING A ROTOR ASSEMBLY

CROSS REFERENCE TO RELATED APPLICATION

This application is related to co-pending patent application Ser. No. 372,718, filed June 22, 1973 entitled "Rotor Assembly for Permanent Magnet Generator".

BACKGROUND OF THE INVENTION

This invention relates to rotary electrical apparatus such as electrical generators and motors. This invention is more particularly related to a process for making a novel rotor assembly for a permanent magnet generator.

A permanent magnet generator is generally comprised of a rotor assembly that includes a plurality of equally spaced magnet poles of alternating polarity around the radially outer surface of the rotor and a stator which generally includes a plurality of windings and magnetic poles of alternating polarity. Rotation of the rotor causes the permanent magnets to pass by the stator poles and coils and thereby induce an electric current to flow in each of the coils. A more detailed description of a permanent magnet generator may be found in U.S. Pat. No. 3,531,670 entitled "Rotary Electrical Apparatus Having Metallic Sleeve for Embracing the Peripheral Sections of Permanent Magnet Rotor" issued Sept. 29, 1970 to D. C. Loudon, hereby expressly incorporated by reference.

It has been known for sometime that a generally ring-shaped permanent magnet rotor assembly is a practical and efficient configuration for the rotor assembly. Early attempts at such a configuration included assembling a plurality of bar type permanent magnets retained in a radial direction by circumferential support rings to form a one-piece ring-shaped permanent magnet having a plurality of equally shaped magnetic poles of alternating polarity around its radially outer surface. An example of such a configuration may be found in U.S. Pat. No. 3,221,194 entitled "Permanent Magnet Rotor" issued Nov. 30, 1965 to A. B. Blackburn, hereby expressly incorporated by reference. The Blackburn patent and the Loudon patent show the development of permanent magnet rotor assemblies. Blackburn utilized a plurality of bar-shaped magnets arranged to make a single ring-shaped magnet and Loudon utilized a plurality of annular ceramic magnets arranged to form a single ring-shaped magnet.

In the aforementioned patents and the prior art, as a whole, it has been an object to obtain maximum energy from permanent magnet generators. However, attempts to maximize electrical energy output have been limited by either limitations of the permanent magnet material itself or the loss or reduction of magnetic properties during fabrication of the magnet or rotor assembly. With respect to the magnet material itself, it has been discovered that cobalt alloyed with a rare earth metal such as samarium may be used to fabricate (by sintering) a one-piece, ring-shaped magnet with radial orientation and superior magnetic properties. Such magnets are generally fabricated from particles of cobalt alloyed with a rare earth metal, such as samarium. The particles are placed in a ring-shaped, silicone rubber mold or die cavity subjected to a radially oriented magnetic field and then compacted and sintered to form the magnet. After sintering, the unmagnetized magnet is assembled into a rotor assembly wherein the magnetic qualities of the ring-shaped magnet are realized by placing the magnet in a charging device such as an impulse magnetizer of the capacitor discharge type which subjects the magnet to an mmf pulse by a properly directed, short duration, high amplitude, direct current pulse.

One method of fabricating an integral rotor assembly of the aforementioned cobalt alloy is to insert a rotor shaft or hub into a mold or die and then add a cobalt rare earth alloy powder which is pressed and sintered around the hub or shaft to form the integral rotor assembly. However, although this procedure results in an improved permanent magnet generator rotor assembly, the fabrication process may result in a reduction of the optimum obtainable magnetic properties of the cobalt alloy magnet.

SUMMARY OF THE INVENTION

This invention provides a process for making an integral rotor assembly for a permanent magnet generator whose permanent magnetic properties may be optimized after completion of the fabrication process. This is accomplished by introducing a barrier of ceramic material between the magnetic flux carrier (hub or shaft) and the cobalt alloy magnet so that when the cobalt alloy is sintered to the flux carrier, migration of flux carrier material to the cobalt alloy and hence poisoning of the magnet is prevented. Coating the entire surface of the ferromagnetic hub with an inert material having a melting point above the sintering temperature of the cobalt alloy prevents contamination of the sintering furnace atmosphere during the sintering of the cobalt alloy magnet to the ferromagnetic hub.

The invention is a process for making a permanent magnet rotor assembly characterized by the step of applying a ceramic coating on the surface of a ferromagnetic hub before sintering a cobalt-rare earth alloy to the hub, the coating preferably being applied by RF sputtering.

In one embodiment of the invention, the novel process for making an integral rotor assembly comprised of a ferromagnetic hub and a ring-shaped cobalt rare earth alloy magnet is accomplished as follows: applying a coating of inert material having a melting point above the sintering temperature of the cobalt alloy to the surface of the ferromagnetic hub; placing the hub in an annular mold or die cavity having its central axis so that the central axis of the hub is coaxial with the central axis of the mold; surrounding the outside of the hub with metal particles by filling the mold with a powdered metal alloy consisting essentially of cobalt and at least one rare earth metal; establishing a magnetic field through the contents of the mold, the magnetic field radially oriented with respect to the central axis of the mold; applying pressure to the contents of the mold to compact the metal particles into a solid one-piece annular member; and applying sufficient heat to sinter the metal alloy to the hub, thereby forming an integral rotor assembly.

Accordingly, it is an object of this invention to provide a process for making a sintered cobalt alloy magnet rotor assembly.

It is an object of this invention to prevent metallurgical contamination of the cobalt alloy magnet with material from the ferromagnetic element mounted integral therewith.

It is still another object of this invention to prevent the contamination of a sintering furnace atmosphere during the sintering of a cobalt alloy to a ferromagnetic member by applying a coating to the surfaces of a ferromagnetic member.

It is a further object of this invention to provide a barrier between a ferromagnetic flux carrier and an integral sintered samarium-cobalt magnet so that migration of the flux carrier material into the samarium cobalt magnet is prevented.

It is a further object of this invention to provide an improved rotor assembly capable of producing a greater amount of electrical energy than previous rotor assemblies.

It is a further object of this invention to provide a process that permits the use of rare earth cobalt alloys to fabricate magnets integrally on a soft ferromagnetic flux conductor.

The above and other objects and features of the invention will become apparent from the following detailed description taken in conjunction with the accompanying drawings and claims which form a part of this specification.

BRIEF DESCRIPTION OF THE DRAWINGS

FIG. 1 is a diagrammatic section view of a rotor assembly embodying the principles of this invention.

FIG. 2 is a diagrammatic view of a permanent magnet generator which utilizes the rotor assembly shown in FIG. 1.

FIG. 3 illustrates a simplified construction of a rotor assembly incorporating the principles of this invention.

DETAILED DESCRIPTION OF THE DRAWINGS

Referring now to the drawings, FIG. 1 illustrates an integral rotor assembly embodying the principles and objects of this invention. The rotor assembly (1) comprises: a rotor shaft (10); a hub (20); a zirconium oxide barrier (30) disposed on the outside surface of the hub (20); a single piece radially oriented ring magnet (40); and a magnet retaining sleeve (50).

The magnet retaining sleeve (50) functions to strengthen the rotor assembly which is subject to varying degrees of radial force during rotation. The magnet retaining sleeve (50) is generally comprised of a strong nonmagnetic metal such as inconel, which is heat shrunk upon the magnet (40). Where the speed of the rotor will not be very high, the magnet retaining sleeve (50) would probably not be necessary in view of the low magnitude radial forces to which the magnet (40) would be subjected.

The ring-shaped magnet (40) is a single piece magnet having a plurality of radially oriented poles of alternating polarity (N & S) which is comprised of a sintered cobalt alloy. The cobalt alloy preferred consists essentially of cobalt combined with at least one rare earth metal. The preferred rare earth elements being samarium and praseodymium although other rare earth metals depending on their availability and cost may also be used. Other rare earth metals including "mischmetal" (a mixture of rare earth metals) may also be used. Cobalt alloys containing at least one rare earth element are presently available from the Raytheon Corporation, Waltham, Massachusetts. A preferred alloy would be about 37 percent (by weight) samarium and the balance cobalt. As previously described in the Background of the Invention, the ring-shaped magnet (40) has been magnetized so that there are a plurality of equally spaced first magnetic poles (N & S) of alternating polarity at its radially outer surface and a plurality of second magnetic poles (N & S) at its radially inner surface adjacent the hub or flux carrier ring (20).

The hub (20) which is the flux carrier for the permanent magnet ring (40) may be comprised of any suitable soft ferromagnetic material. In most rotor assemblies, the ring magnet (40) is mounted directly onto the hub (20) which then in turn is mounted to the shaft (10) by some suitable means such as welding, end plates, etc.

The essential feature of this invention in the novel rotor assembly is an inert layer (30) which is disposed as a barrier between the outer periphery of the hub (20) and the inner periphery of the ring-shaped magnet (40). This barrier (30) of inert material is preferably a layer of material that is coated on the outer surface of the hub (20) as an integral part thereof and which later becomes an integral part of the inner surface of the ring-shaped magnet (40) which is compacted and sintered upon the hub (20). Generally, this is accomplished by placing the powdered cobalt rare earth alloy in a silicone rubber mold or die cavity in which the hub is already located, subjecting the powdered alloy to a radially oriented magnetic field, and then compressing and sintering the material to the hub (20). The preferred process for making the hub (20) and the ring-shaped magnet (40) an integral piece is sintering, which is a process wherein the particles of the rare earth cobalt alloy are welded together by subjecting the compacted powder to a temperature below the melting point thereof but sufficient to allow the powdered metal particles to coalesce. In view of the fact that cobalt has a melting point of 1493°C. and its rare earth alloys have comparable melting points, it is important that the inert material (30) which forms a barrier between the cobalt alloy magnet (40) and the hub (20) be a high temperature alloy so that during the sintering process, the barrier is not vaporized or melted away leaving voids which would allow migration of the ferromagnetic material from the hub (20) into the cobalt alloy, an effect that may result in the lessening of the magnetic properties of the cobalt alloy after sintering.

The barrier (30) is preferably therefore a ceramic or suitable high temperature inorganic oxide, organic materials being unsuitable because of their inability to maintain their barrier function during and after exposure to the temperatures necessary to sinter cobalt alloys. Examples of suitable inorganic oxides are magnesium oxide, beryllium oxide, zirconium oxide, titanium oxide, and aluminum oxide, zirconium oxide and aluminum oxide being preferred. It should be noted at this point that any inert material that has thermal properties sufficient to maintain its integrity as a barrier during and after the sintering of the cobalt alloy to the hub is suitable. Such inert materials may be selected from any standard "Handbook of Chemistry and Physics."

With respect to applying a metal oxide coating (30) to the hub (20), the process of metal spraying or flame spraying may be used. Metal spraying is a method of spraying metal through a gun for the purpose of coating different objects. The gun commonly used is a gas gun. In this gun the metal to be sprayed is introduced in the form of wire through a central tube. Through an annular space surrounding this tube a gaseous mixture, either hydrogen or acetylene with oxygen or air, is passed, which upon burning at the orifice, melts the wire in the inner part of the conical flame. Compressed air or other gas (e.g., oxygen) is passed through an outer annular space for the purpose of atomizing, spraying and oxidizing the sprayed metal.

Another suitable process for coating an object with an inorganic oxide, such as zirconium oxide or magnesium oxide, is vacuum coating. Vacuum coating is the evaporation of a material under vacuum and subsequent condensation on a work surface. To coat a hub with zirconium oxide, the zirconium is vaporized in an atmosphere of oxygen at a pressure below atmosphere so that as the zirconium vapor condenses on the hub an oxide is formed.

The preferred process for coating a hub with a high temperature inert inorganic material is sputtering. Sputtering is a process wherein there is deposited on a work surface a thin film of metal disintegrated from a surface which was under ion bombardment. Commercially available devices for accomplishing sputtering are available from the Bendix Scientific Instruments & Equipment Division. One such device is a "Plasmavac" which is a thin film sputtering system that applies a coating to a substrate by evaporation or by evaporation and sputtering or by sputtering alone. A description of a sputtering device for sputtering metallic elements and their alloys may be found in U.S. Pat. No. 3,305,473 entitled "Triode Sputtering Apparatus for Depositing Uniform Coatings" issued Feb. 21, 1967 to R. N. Moseson, hereby expressly incorporated by reference. An example of a sputtering apparatus for depositing nonmetallic materials such as dielectrics may be found in U.S. Pat. No. 3,451,917 entitled "Radio Frequency Sputtering Apparatus" issued June 24, 1969 to R. M. Moseson, hereby expressly incorporated by reference. Sputter coating the hub is preferred because sputter coating allows very thin films sometimes in the order of one molecule thick. Therefore, since the coating is extremely thin thermal expansion of the barrier material is not an adverse factor. Further, the extremely thin barrier layer accomplishes its purpose as a barrier while at the same time minimizing the magnetic air gap between the ferromagnetic hub and the cobalt alloy magnet.

Although the hub (20) is a separate element physically mounted on the rotor shaft (10), the rotor shaft (10) and the hub (20), if desired, may be formed from a single piece.

FIG. 2 illustrates a diagrammatic view of an electrical generator, i.e., stator assembly (70) and the rotor (1) illustrated in FIG. 1. Such a generator has a stator (71) formed of a plurality of laminations, the stator (71) telescoped within and secured to a housing (74) by some suitable means (not shown). The rotor assembly (1) which includes the rotor shaft (10), the hub (20), the barrier (30), the annular magnet (40), and the magnet retaining sleeve (50) is journalled in the housing (74) by a forward and rear bearing (not shown). The stator (71) has a plurality of equally spaced and annularly arranged pole pieces (72) of alternate polarity, with every other pole piece having a coil or winding (73) thereabout. The windings or coils (73) are generally all wound in the same direction and are preferably connected in electrical series relationship. Upon rotation of the rotor assembly, there are thus formed three separate sources of continuous alternating current, the first source having leads (81, 82), the second source having leads (91, 92) and the third source having leads (101, 102).

FIG. 3 is a simplified diagrammatic view of a rotor assembly that incorporates the objects of this invention. In this embodiment there is no hub portion as the flux carrier for the magnet (40) is a ferromagnetic shaft (10). The ferromagnetic shaft (10) has a suitable ceramic material sputter coated thereon, such as zirconium or aluminum oxide so that when the magnet (40) is sintered upon the shaft (10), no migration of soft ferromagnetic shaft material into the cobalt alloy takes place.

While a preferred embodiment of the invention has been disclosed, it will be apparent to those skilled in the art that changes may be made to the invention as set forth in the appended claims and, in some instances, certain features of the invention may be used to advantage without corresponding use of other features. Accordingly, it is intended that the illustrative and descriptive materials herein be used to illustrate the principles of the invention and not to limit the scope thereof.

Having described the invention, what is claimed is:

1. A process for making an integral rotor assembly comprised of a ferromagnetic hub and a ring-shaped cobalt alloy magnet, said process comprising:

applying a coating of inert material having a melting point above the sintering temperature of said cobalt alloy to the surface of said ferromagnetic hub;

placing said hub in an annular die cavity having a central axis so that the central axis of said hub is coaxial with said central axis of said die cavity;

surrounding the outside of said hub with metal particles by filling said die cavity with metal particles consisting essentially of cobalt and at least one rare earth metal;

establishing a magnetic field through the contents of said die cavity, said magnetic field radially oriented with respect to the central axis of said die cavity;

applying pressure to the contents of said die cavity to compact said metal particles into a solid one-piece annular member; and applying sufficient heat to sinter said metal particles to the coated hub, thereby forming an integral rotor assembly.

2. The process for making the integral rotor assembly as described in claim 1 wherein the metal oxide coating is applied by the process known as sputtering.

3. The process for making an integral rotor assembly as recited in claim 1 wherein the step of coating said hub with a metal oxide is accomplished by the method known as flame spraying.

4. The process for making an integral rotor assembly as recited in claim 1 wherein the coating of said hub with a metal oxide is applied by vapor deposition.

5. The process for making an integral rotor assembly as recited in claim 1 wherein the coating of inert material is selected from a group consisting of zirconium oxide, magnesium oxide, beryllium oxide, titanium oxide, and aluminum oxide.

6. The process for making a rotor assembly as recited in claim 2 wherein the coating of inert material is selected from a group consisting of zirconium oxide, aluminum oxide, magnesium oxide, calcium oxide and titanium oxide.

7. A process for making an integral permanent magnet generator rotor assembly comprised of a ferromagnetic hub and a ring-shaped rare earth and cobalt alloy magnet, said process comprising:

sputter coating a ceramic material on the surface of said hub;

placing said hub coaxially within an annular mold having a central axis;

filling said mold around said hub with a powdered metal consisting essentially of cobalt and at least one rare earth metal;

subjecting the contents of the mold to a magnetic field radially oriented with respect to the central axis of said mold;

applying pressure to the contents of said mold to compact said metallic powder into a solid one-piece annular member around said hub; and sintering said powdered metal to form the coated hub and the sintered metal member into an integral rotor assembly.

8. The process for making an integral rotor assembly as recited in claim 7 wherein the ceramic coating is selected from a group consisting of the zirconium oxide, magnesium oxide, beryllium oxide, titanium oxide, and aluminum oxide.

9. The process for making a rotor assembly as recited in claim 7 wherein the ceramic coating is selected from a group consisting of zirconium oxide, aluminum oxide, magnesium oxide, calcium oxide and titanium oxide.

* * * * *